March 19, 1968   L. PARKIN ET AL   3,373,789
SHEET METAL NUT WITH RESILIENT CAGE Filed June 29, 1966   2 Sheets-Sheet 1

INVENTORS
LESLIE PARKIN &
SYDNEY ALAN ANDREWS,
By Philip E. Parker
ATTORNEY ing Mar. 19, 1968

United States Patent Office 3,373,789
Patented Mar. 19, 1968

3,373,789
SHEET METAL NUT WITH RESILIENT CAGE
Leslie Parkin, Bobbers Mill, and Sydney Alan Andrews, Stapleford, England, assignors to United-Carr Incorporated, Boston, Mass., a corporation of Delaware
Filed June 29, 1966, Ser. No. 561,568
Claims priority, application Great Britain, Aug. 24, 1965, 36,303/65
1 Claim. (Cl. 151—41.75)

ABSTRACT OF THE DISCLOSURE

A two-piece cage nut adapted for rapid installation in an apertured support. The cage includes an apertured base, opposed flexible side walls extending normal to the edges of the base and adapted to be snapped through an aperture in the support and an arm extending laterally outwardly from the end of each side wall for engaging the face of a support adjacent an aperture therein. A nut disposed within the cage includes a head underlying the base of the cage, a threaded barrel extending through the aperture in the base of the cage and opposed generally rectangular walls extending from the edges of the head. Certain of the walls of the nut define a pair of opposed gaps in which the side walls of the cage are nested to prevent inward flexing of the latter for passage thereof through an aperture in a support. The nut also includes a pair of opposed lugs extending from other walls thereof, which lugs are adapted to engage the edges of a support aperture to limit rotation of the nut with respect to the support.

---

The present invention provides a nut device for assembly in an opening in a support comprising a cage defined by an apertured base and opposed side walls extending substantially normal to said base, means on each side wall engageable with one face of the support, nut means assembled with said cage and comprising a head disposed in said cage and an internally threaded barrel projecting from said head through the aperture in said base, the head also having opposed side walls engaging an opposite face of said support to said means.

The invention also provides an assembly comprising a support having an opening of rectangular shape and a nut device assembled therein, said nut device comprising a cage of generally rectangular shape defined by an apertured base and opposed side walls extending substantially normal to the base and projecting into said opening, a lateral arm on each said wall engaging one face of the base, nut means within said cage comprising a head underlying the base of the cage and an internally threaded barrel integral with the said head and extending through the aperture in the base of the cage, opposed walls extending substantially at right angles to the said head and engaging the face of the support opposite to that engaged by the said arms, stop means integral with each said wall of the head extending into the opening in the support for limiting the rotational movement of the nut device within said opening.

Preferably the barrel extends integrally from a head portion which overlies the inner face of the base of the device and is provided with lugs which are adapted to serve as stops limiting the rotation of the device within the aperture in the support.

The provision of the barrel provides a plurality of screw threads so that a screw threaded bolt can be more firmly gripped than would be the case with the nut device of the parent application.

Figure 1:
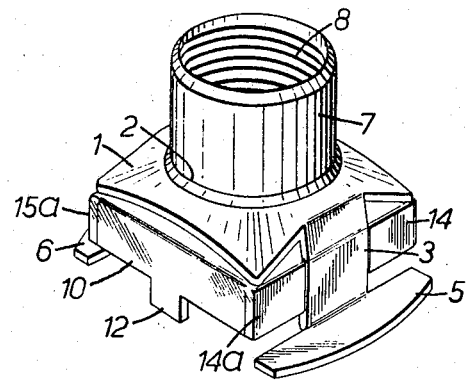
Figure 2:
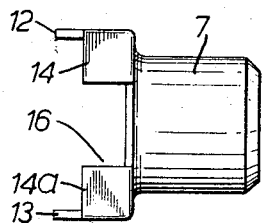
Figure 3:
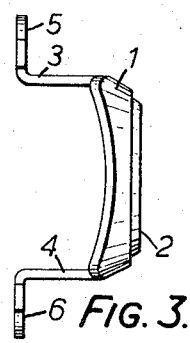
Figure 4:
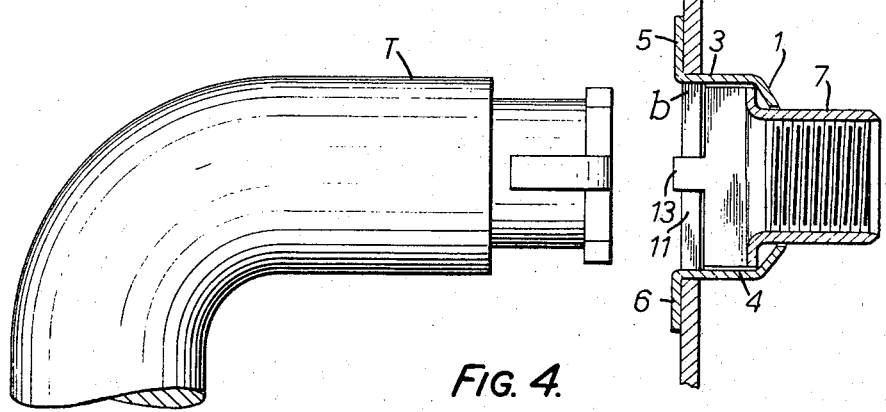
Figure 5:
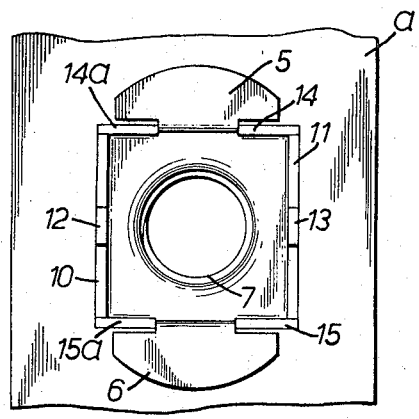
Figure 6:
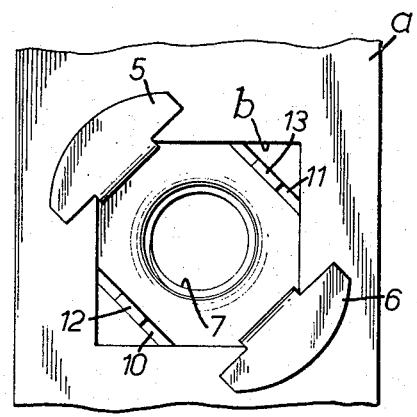

To enable the invention to be fully understood, it will now be described, by way of example, with reference to the accompanying drawings in which:

FIGURE 1 is a perspective view of a nut device according to one embodiment of the invention;
FIGURE 2 is a side elevation of the nut means;
FIGURE 3 is a side view of the case or cage in which the nut means is mounted;
FIGURE 4 is a sectional side view of the device assembled with the support;
FIGURE 5 is a plan view showing the nut device in its initial position of assembly with an apertured support; and FIGURE 6 is a plan view of the nut device in its final position of assembly.

As illustrated in the accompanying drawings, the nut device comprises a cage member formed of sheet metal and including a bottom wall 1 having a transverse curvature and formed with a central opening 2 of circular shape.

At opposed side edges the wall 1 is formed with integral portions 3, 4, extending substantially normal to the side edges of the bottom wall 1 and provided with arms 5, 6, extending outwardly substantially at right angles to the said portions 3, 4, respectively.

A nut means is provided separately from the case or cage and preferably made of sheet metal and comprises a barrel 7 formed with internal screw threads 8. At one end the barrel has an integral head 9 provided with opposed side walls 10, 11 extending integrally and in parallel relation to the axis of the barrel, each wall being provided at its free edge with a centrally disposed lug 12, 13. The head is formed with further integral walls 14, 14a, 15, 15a at the other two opposed side edges, each pair of wall portions 14, 14a, 15, 15a extending only part way along the side edges of the head so as to leave central gaps 16, 17.

The nut means is assembled with the cage by inserting the barrel 7 through the opening 2 and snapping the head between the resilient portions 3 so that the latter are disposed in the central gaps 16, 17. The dimension of the parts is such that when the nut means is snapped into the cage, the edges of one or both the arms 5 extend slightly over the side edges of one or more of the wall portions 14, 14a, 15, 15a so as to retain the nut means in assembly with the cage.

As shown, the support a has an aperture b of rectangular shape having dimensions slightly greater than the rectangle defined by the wall portion of the nut means. This enables the nut device to be pushed into the aperture into the position indicated in FIGURE 5 so that the arms overlap one face of the support.

By means of a suitable tool t having a square end for nesting in the rectangular recess of the nut means defined by the said wall portions the device is rotatable in an anti-clockwise direction through approximately 45° into the position indicated in FIGURE 6, wherein it will be noted the arms 5 overlap portions of one face of the support adjacent two corners of the aperture and the free edges of the wall portions of the nut means overlap portions of the opposite face of the support at the said corners.

During the rotation of the device into assembled position, the trailing edges of the portions 3 of the cage and lugs 12, 13, of the nut means will be drawn past the side walls of the aperture and these trailing edges will offer a certain amount of resistance to rotation but in fact the device can be rotated into the position indicated in FIGURE 6 without difficulty by means of the torque which can be readily applied by the use of a tool such as indicated in FIGURE 4.

When the device is in the position indicated in FIGURE 6, any attempt to rotate it reversely or forwardly into the position such as that indicated in FIGURE 6 is prevented by the side edges of the lugs 12, 13, engaging the adjacent side edges of the wall of the aperture. It will be noted that any attempt to rotate the device from the FIGURE 6 position will result in the leading edges of the lugs as distinct from the trailing edges being brought into engagement with the edges of the aperture, and accordingly these leading edges of the lugs will tend to bite into the side walls of the aperture. The device may be permitted a limited amount of rotational movement when in the FIGURE 6 position to permit the nut means to be aligned with a screw threaded stud to be screwed into the barrel 7, but this limited movement is arrested on one or other of the lugs 12, 13, being brought into abutment with an edge of the aperture in the support. While the nut device has been described as being rotated in an anti-clockwise direction to secure it in the aperture in the support, it will be understood that it could equally be rotated in a clockwise direction.

The transverse curvature of the bottom wall 1 of the cage member provides an arched form having a concave face directed towards the support when the device is assembled therewith with the advantage that it provides a resilient support for the nut means.

It will be noted that the barrel 7 of the nut means enables a plurality of screw threads to be formed therein so that a stud screwed into the barrel will engage a number of the threads and thereby provide a strong connection as distinct from an arrangement wherein the nut means comprises a helix forming a single screw thread.

What is claimed is:

1. An assembly comprising a support having an opening of rectangular shape and a nut device assembled therein, said nut device comprising a cage of generally rectangular shape defined by an apertured base and opposed side walls extending substantially normal to the base and projecting into said opening, a lateral arm on each said wall engaging one face of the base, nut means within said cage comprising a head underlying the base of the cage and an internally threaded barrel integral with the said head and extending through the aperture in the base of the cage, opposed walls extending substantially at right angles to the said head and engaging the face of the support opposite to that engaged by the said arms, certain of said opposed walls defining a pair of opposed gaps in said nut means, said opposed side walls of said cage being disposed in said gaps to allow for inward flexing thereof toward the axis of said barrel, and stop means in the form of opposed lugs formed integral with other of said walls of said head extending into the opening in the support for limiting the rotational movement of the nut device within said opening, said lugs lying in planes parallel to a plane passing through the midpoint of said gaps and the axis of said barrel.

References Cited

UNITED STATES PATENTS

| | | | |
|---|---|---|---|
| 1,768,505 | 6/1930 | Carr | 85—80 |
| 2,406,415 | 8/1946 | Tinnerman | 85—80 |
| 2,567,902 | 9/1951 | Bedford | 151—41.75 |
| 2,596,332 | 5/1952 | Flora et al. | 151—41.75 |
| 2,748,825 | 6/1956 | Launay | 151—41.75 |
| 2,967,556 | 1/1961 | Jaworski | 85—80 |

FOREIGN PATENTS 1,387,595   12/1964   France.

MARION PARSONS, Jr., *Primary Examiner.*